Dec. 25, 1934.  W. DAYA  1,985,241

DEVICE FOR REMOVING DISTURBANCES IN WIRELESS TRANSMISSION

Filed June 30, 1932   2 Sheets-Sheet 1

Werner Daya
Inventor by ⟨signature⟩
Attorney

Dec. 25, 1934.  W. DAYA  1,985,241

DEVICE FOR REMOVING DISTURBANCES IN WIRELESS TRANSMISSION

Filed June 30, 1932  2 Sheets-Sheet 2

Patented Dec. 25, 1934

1,985,241

UNITED STATES PATENT OFFICE 1,985,241

DEVICE FOR REMOVING DISTURBANCES IN WIRELESS TRANSMISSION

Werner Daya, Berlin-Halensee, Germany

Application June 30, 1932, Serial No. 620,149. In Germany July 10, 1931

11 Claims. (Cl. 250—33)

In contra-distinction to transmission by wire every wireless transmission is subject to the disadvantage that the quality and the security of the connection between the transmitting and the receiving station can be affected by physical influences of a variety of kinds. The chiefly experienced disturbances are such caused upon the transmission systems by fading zones, shadow fields, screenings and separate heterodynes. All electrical or electro-physical hindrances lying in the way of the wave propagation, or also certain mass influences becoming active especially on short transmission systems, form dead zones, cause screenings or give rise to undesired consumption of the transmission energy.

These phenomena appear, on principle, in all radio-technical services, become, however, particularly disagreeable in the wireless communication in railway traffic, for instance, as regards train telephony and telegraphy, signal transmission or brake services and the like. Everywhere where a system crosses a bridge or passes through a tunnel, or extends past industrial plants where machines are operating or where there are high-voltage systems and so on, or where lines describe curves, especially in mountains, there arise, besides the general disturbances due to electro-physical causes, also separate disturbances due to the particular place.

My invention presents a means for overcoming disturbances of the above-mentioned kind, in that I provide for transmission systems where said disturbances arise or can arise particular or separate auxiliary members by which the dead sections are bridged so as to convey the energy across them. For this purpose said auxiliary members are preferably so arranged that they lie, spatially or electrically, nearer to the transmission or the receiving apparatus, or the antennæ of the same, than to the disturbing factors.

In contra-distinction to the transmission and receiving antennæ the above-mentioned auxiliary members will best be termed intermediate antennæ. The practical design of the same must be accommodated, of course, to the individual purpose of every individual case.

The invention is illustrated diagrammatically and by way of example on the accompanying drawings, in which Fig. 1 is a plan of a piece of track with a train thereon.

In these examples the invention is used in connection with a railway for braking the cars of a train, the transmitting apparatus being mounted upon the locomotive and the receiving apparatus being mounted upon one of the cars which, for instance, in the case of a long freight train may be the last car or one of the last cars. Such an arrangement is useful, for instance, to equalize losses of time in the braking procedure.

Figure 1:
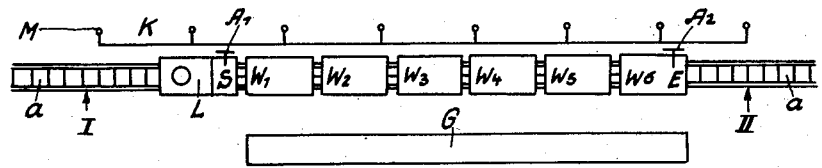

Referring to Fig. 1 *a* denotes the track upon which is running a train consisting of the locomotive L and of the cars or wagons W1, W2, W3, W4, W5, W6. On the locomotive are mounted the transmitter S and the antennæ A1 which may be of any suitable description, and on the last car (W6) are mounted the receiver E and the antennæ A2 which may likewise be of any suitable description. In the practical employment of such a plant the most varied disturbances may arise; they may be caused for instance, by high-voltage lines or telephone lines extending along the track, or by iron bridges or by tunnels or by curves of the track, especially in a mountainous region; also industrial plants extending along the track may give rise to disturbances. In Fig. 1 a long industrial building is assumed to constitute such a disturbing cause.

Now, in order to remove the disturbance I provide an intermediate antenna K (Figs. 1 and 2) by which the energy emitted by the transmitter S is conducted through the zone of disturbance to the receiver E. It is suited to the purpose to make said intermediate antenna so long that it extends at both ends beyond said zone so that it can receive or (and) deliver the electric oscillations without being impeded by the building G or whatever else the disturbing cause may be.

In some cases it will be sufficient to provide such an intermediate antenna laterally from that is to say at a side of, the track so as to bridge the zone of disturbances and carry the high-frequency oscillations. This is the case in the example shown in Figs. 1 and 2 in which M denotes poles supporting a wire or a cable K extending parallel the track from about the point I to about the point II. From Fig. 2 it appears that the intermediate antenna lies nearer to the transmitting antenna $a^1$ and to the receiving antenna $a^2$ of the train than does the disturbing building G. This is an important feature of the invention and decisive for its effect, viz: that the distance between the transmitting antenna and the receiving antenna of the train and the intermediate antenna on the other side must be shorter than the distance between said train antennæ and the cause of disturbance.

Figure 2:
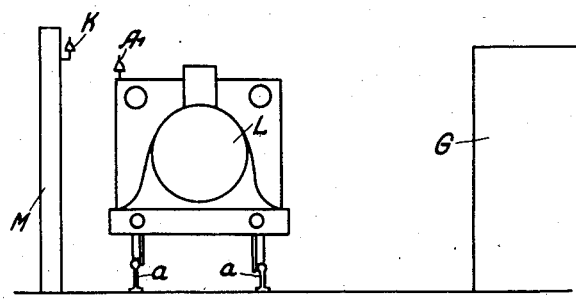
Fig. 2 is a front view of the locomotive and of certain adjacent parts more fully dealt with hereinafter, this figure being drawn to a greatly enlarged scale relatively to Fig. 1.
Figure 3:
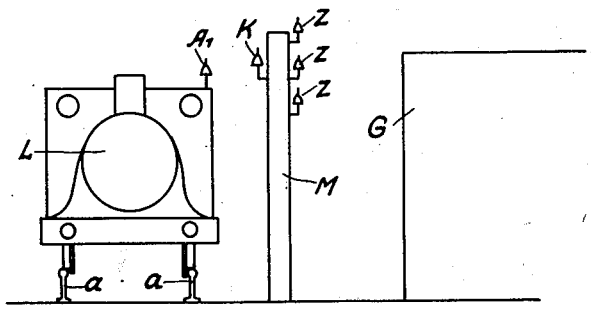
Figs. 3 and 4 are views similar to Fig. 2 and show two modifications.

There exist, however, cases in which an intermediate antenna like K in Figs. 1 and 2 and arranged as in these figures is not sufficient to overcome completely the existing disturbances. That is the case, for instance, where the cause of disturbance consists in a particularly long iron bridge or is constituted by a tunnel etc. In such a case provision must be made that the intermediate antenna itself is separately screened towards the cause of disturbance, but lies open towards the antennæ of the train. An example of this kind is shown in Fig. 3. M denotes again the poles erected along the track and bearing the intermediate antenna K. Now, in order to prevent the cause of disturbance G from acting detrimentally upon the intermediate antenna K, this latter is screened, in the example in question, by three wires or cables Z which may extend singly or may be interlinked; instead of these wires or cables equivalent means may be used. The intermediate antenna K co-operates with the train antennæ, whereas the screening wires or cables Z co-operate so-to-say with the cause of disturbance and prevent this latter from affecting the train antennæ. The intermediate antenna lies, besides spatially, also electrically nearer to the train antennæ than to the cause of disturbance G, whatever object the letter of reference G may denote.

Screenings of this kind may be designed in a variety of constructional forms. In the further example shown in Fig. 4 poles are dispensed with and the intermediate antenna K is attached to insulators J arranged between the rails of the track $a$. The intermediate antenna is screened in this case by the rails themselves, but it is suited to the purpose, when making use of said arrangement, to provide, besides the train antenna A1 another train antenna H1 arranged below the locomotive, thus above the space of the antenna K. It is a matter of course that a second train antenna like H1 should be provided also at the car or wagon bearing the receiver.

Figure 5:
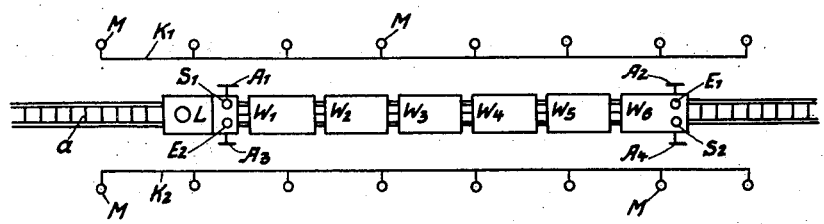
Fig. 5 is a view similar to Fig. 1 and shows a modification thereof.

The invention can be used also in such cases in which the wireless plant of the line is designed for double or multiservice. An example for such a constructional form is given in Fig. 5 which is intended for duplex operation between the locomotive L and the car or wagon W6, the locomotive being provided with the transmitter S1 for the receiver E1 of the car or wagon W6 and this latter being provided with the transmitter S2 for the receiver E2 of the locomotive. The appertaining antennæ are A1 and A3 upon the locomotive and A2 and A4 upon the car W6. If one intermediate antenna should prove insufficient for duplex operation, two thereof can be provided, as K1 and K2 in Fig. 5. While separate poles M are provided in this figure as carriers for the two antennæ K1 and K2 I wish it to be understood that these antennæ may be carried also by the same poles.

Figure 6:
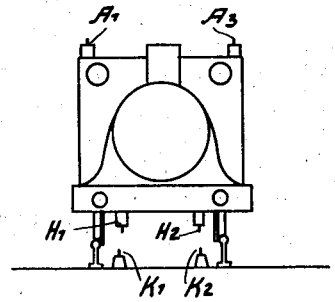
Fig. 6 is also a front-view of a locomotive in connection with certain other parts also more fully dealt with hereinafter.
Figure 4:
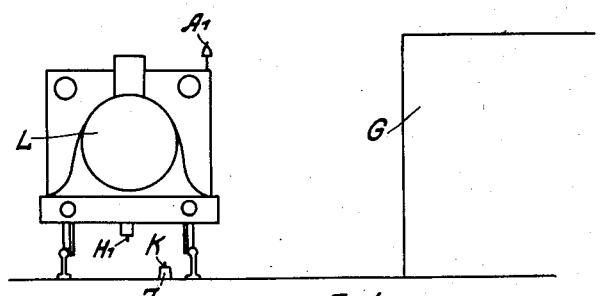

The two antennæ may, however, also be arranged in the same manner as in Fig. 4 that is to say, they may be located between the rails. An example therefor is shown in Fig. 6 in which again K1 and K2 are the two intermediate antennæ and A1 and A3 are the antennæ on the locomotive (as in Fig. 5).

Figure 7:
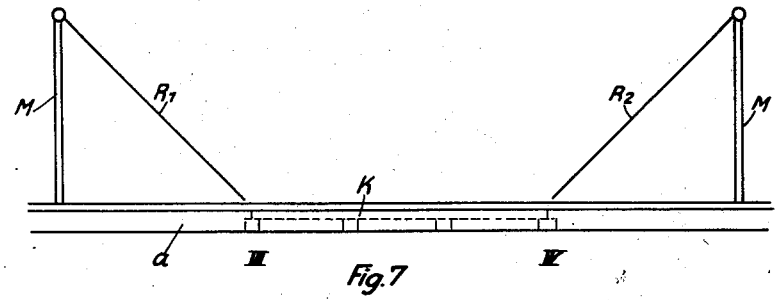
Fig. 7 is a side-view of a part of a track, together with some poles and antennæ.

The invention is applicable also in cases in which the transmitter and the receiver are mounted not upon the same train, but upon two trains of which one bears the transmitter and the other the receiver and which are to give signals one to another by wireless transmission. The invention is besides applicable also in such cases, in which one of the two co-operating apparatuses, for instance the transmitter is stationarily mounted, for instance, in a station or at an interlocking frame. Also in such cases the intermediate antenna or antennæ can be mounted in any of the above-described manners, but especially in the latter case it will be suited to the purpose in view to design the intermediate antenna in such a manner that it is screened only in the region of disturbance whereas it is not screened outside the same. If, for instance, on such a length of track as indicated by the distance between the points I and II in Fig. 1 the screening wires are arranged between the rails, as in Figs. 4 and 6, then any of the ends of the screening wire, or both its ends, may extend beyond said points freely into the air, or it or they may be run in the manner of a directional aerial. In Fig. 7 K denotes the screened portion of the intermediate antenna which extends between the rails from the point III to the point IV, whereas the portions R1 and R2 run upwardly and outwardly into the open air.

Designing the intermediate antenna in the manner shown in Fig. 7 may be used also in connection with all other cases occurring, for instance, with that shown in Fig. 3, in which case the screening wires Z are to extend only between the points III and IV (Fig. 7) whereas the portions of the intermediate antenna lying beyond the ends of the intermediate antenna need not be screened.

An intermediate antenna designed and arranged in any of the manner above dealt with by way of example, or designed and arranged in an equivalent or similar manner may be made use of also in other cases than such connected with railway traffic, that is to say, in all cases where disturbing causes such as shade fields, local fadings etc. etc., exist. In such cases the ends of the intermediate antenna which preferably extend sufficiently far beyond the region of disturbance are further extended freely to such a height that they are out of the range of action of disturbing influences due to the respective tracts of land or to buildings or plants and the like. In so far in such a case not the entire intermediate antenna is attached to poles, the ends of that antenna will be supported or suspended in such a manner that the desired free and raised position and direction is obtained.

As has already been emphasized, it is immaterial for which transmitting purpose the transmitting plant equipped with the new auxiliary member viz: the intermediate antenna in its various constructional forms, is intended. It is fundamentally, the object of the intermediate antennæ to convey electric waves through zones of disturbance and to render secure and reliable the utilization of the same, or to amplify said waves.

Especially as regards railway traffic the intermediate antenna may be used for the feeding of stationary or portable receivers, as well as for increasing the energy propagation of the stationary or portable receivers, for instance, if there are disturbing influences in the neighborhood thereof.

Finally I wish to be understood that I do not limit my claims solely to the constructional forms of the invention and the details thereof, as illustrated merely by way of example. Many departures in the details are possible without constituting departures from the invention. It is obvious also that the invention is not confined solely to railway trains and the like, but that it is equally applicable to communication between any two stations, one of which is mobile and the other of which may be either stationary or mobile.

I claim:

1. In a system for wireless communication with mobile stations adapted to enter a region disturbing to the said wireless communication; means for maintaining communication with said stations while the same are in said disturbing region, said means comprising a main antenna carried by said stations and an auxiliary antenna coupled to said main antenna and having a signal collecting and outsending portion extending outside the disturbing region.

2. In a system for wireless communication with mobile stations adapted to enter a region disturbing to the said wireless communication; means for maintaining communication with said stations while the same are in said disturbing region, said means comprising a main antenna carried by said stations and auxiliary antennæ coupled to said main antenna and having signal collecting and outsending portions extending outside the disturbing region.

3. In a system for wireless communication with mobile stations adapted to enter a region disturbing to the said wireless communication; means for maintaining communication with said stations while the same are in said disturbing region, said means comprising a main antenna carried by said stations, and an auxiliary antenna coupled to said main antenna and having a portion extending outside the disturbing region, as well as an electric shielding for said auxiliary antenna lying inside said region and open with respect to the said main antenna, substantially as and for the purpose set forth.

4. In a system for wireless communication with a station carried by a railway vehicle adapted to enter a region disturbing to the said wireless communication; means for maintaining communication with said station while the same is in said disturbing region, said means comprising a main antenna carried by said station and an auxiliary antenna coupled to said main antenna and having a portion extending outside the disturbing region, said auxiliary antenna being shielded by the rails of the track.

5. In a system for wireless communication with a mobile station adapted to enter a region disturbing to the said wireless communication; means for maintaining communication with said station while the same is in said disturbing region, said means comprising a main antenna carried by said station, and auxiliary antennæ coupled to said main antenna and each having a portion extending outside the disturbing region, as well as an electric shielding for said auxiliary antenna lying inside said region and open with respect to the said main antenna, substantially as and for the purpose set forth.

6. In a system for wireless communication with a mobile station carried by a railway vehicle adapted to enter a region disturbing to the said wireless communication; means for maintaining communication with said station while the same is in said disturbing region, said means comprising a main antenna carried by said station and auxiliary antennæ coupled to said main antenna and each having a portion extending outside the disturbing region, said auxiliary antennæ being shielded by the rails of the track.

7. In a system for wireless communication with mobile stations adapted to enter a region disturbing to the said wireless communication, means for maintaining communication with said stations especially while the same are in said disturbing region, said means comprising a main antenna carried by said stations and an auxiliary antenna coupled to said main antenna and having a signal collecting and outsending portion outside the disturbing region.

8. In a system for wireless communication between stations at least one of which is mobile and adapted to enter a region disturbing to the said wireless communication, means for maintaining communication between the said stations while the disturbing region is between the said stations and adjacent one of them, said means comprising a main antenna carried by said last named station and an auxiliary antenna coupled to said main antenna and having a signal collecting and outsending portion extending outside the disturbing region.

9. In a system for wireless communication between stations at least one of which is mobile and adapted to enter a region disturbing to the said wireless communication, means for maintaining communication between the said stations while the disturbing region is between the said stations, said means comprising a main antenna carried by said last named station and an auxiliary antenna coupled to said main antenna and having a signal collecting and outsending portion extending outside the disturbing region.

10. In a system for wireless communication between stations at least one of which is mobile, whereby a region disturbing to the said wireless communication may come into position to interfere with the communication between the said stations, means for maintaining communication between the said stations while the disturbing region thus interferes with said communication between the said stations, said means comprising an antenna, which bridges over the disturbing region and has a signal collecting and outsending portion extending outside the disturbing region.

11. A process for providing and maintaining wireless communication between two stations which are relatively movable whereby a region disturbing to the said wireless communication may come into position to interfere with the communication between the said two stations, said process consisting in conveying the energy providing the communication through free space between the said stations as radiant energy except through the disturbing region and in said disturbing region conveying the energy through a galvanically conductive path, by receiving said energy and conducting it into one end of said path and retransmitting it as radiant energy from the other end of said path.

WERNER DAYA.